3,113,135
7-ACYL-8-HYDROXYQUINOLINES AND
-HYDROXYQUINALDINES
Ernst Hodel, Basel, Switzerland, assignor to
J. R. Geigy A.-G., Basel, Switzerland
No Drawing. Filed Mar. 30, 1961, Ser. No. 99,360
Claims priority, application Switzerland Mar. 31, 1960
16 Claims. (Cl. 260—289)

The present invention concerns new anti-microbial 8-hydroxyquinoline derivatives acylated in the 7-position.

By an anti-microbial compound is meant a compound with either bacteriostatic, including tuberculostatic, bacteriocidal, fungistatic or fungicidal activity, as well as a compound with two or more of the foregoing activities.

It has now been found that 8-hydroxyquinolines and 8-hydroxyquinaldines having an acyl group in the 7-position of the general formula

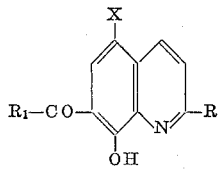

wherein
R represents hydrogen or the methyl group,
X represents a halogen atom, a low molecular alkyl radical or a phenyl or benzyl radical possibly substituted by halogen atoms or low molecular alkyl groups, and
$R_1$ represents an alkyl radical possibly substituted by halogen atoms or it represents a phenyl radical possibly substituted by halogen atoms or low molecular alkyl groups, are obtained by reacting, in the presence of a Friedel-Crafts condensing agent, in particular aluminium chloride, 8-hydroxyquinolines substituted in the 5-position, of the general formula

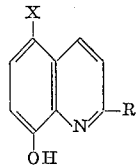

wherein R and X have the meanings given above, with an acid halide of the general formula $$R_1\text{—CO—Hal} \qquad III$$

wherein Hal represents chlorine or bromine and $R_1$ has the meaning given above, the reaction being performed in an inert organic solvent.

The compounds of the general Formula I according to the invention have an excellent fungicidal action which is superior to that of 8-hydroxyquinoline and 8-hydroxyquinaldine and their salts. They are suitable as active ingredients for fungicidal agents for the most various purposes, particularly for combatting fungi in plant protection and as seed dressings as they have a good action against *Fusarium culmorum*. These compounds can also be used for the protection of organic materials as, for example, they greatly restrict the growth of *Aspergillus niger* and *Penicillium expansum*. The new compounds also have polyvalent bacteriostatic properties and restrict the growth of, for example, Staphylococci, *Escherichia coli, Klebsiella pneumoniae* and typhus bacilli. They are also active in vitro against tubercle bacilli. They are distinguished principally, however, by their strong activity against pathogenic fungi, for which reason they are excellently suitable for use in human and veterinary medicine as well as for technical disinfectant purposes.

Preferably nitrobenzene, tetrachloroethane and o-dichlorobenzene for example are used as inert organic solvents or diluents for the reaction according to the invention. The reaction is performed advantageously with an excess of the acid halide of the general Formula III at a raised temperature. Depending on the size and type of the radical $R_1CO$— to be introduced, the suitable reaction temperature can vary between about 70 and 120° C. When aluminium chloride is used as condensing agent, hydrogen chloride is developed during the reaction, which development ceases on completion thereof. The end product is worked up after removal of the diluent by steam distillation, preferably by precipitation as hydrochloride or perchlorate. The new 7-acyl-8-hydroxyquinolines are obtained from the hot aqueous solution of the latter by the addition of ammonia.

Examples of starting materials of the general Formula II are: 5-chloro-8-hydroxyquinoline and 5-chloro-8-hydroxyquinaldine, 5-bromo-8-hydroxyquinoline and 5-bromo-8-hydroxyquinaldine, 5-methyl-8-hydroxyquinoline and 5-methyl-8-hydroxyquinaldine as well as 5-ethyl-, 5-propyl-, 5-isopropyl-, 5-n-butyl-, 5-tert. butyl- and 5-isobutyl-8-hydroxyquinoline and -8-hydroxyquinaldine, also 5-phenyl-, 5-benzyl-, 5-(p-chloro-phenyl)-, 5-(p-chlorobenzyl)-, 5 - (dichlorophenyl) - 8 - hydroxyquinoline and -8-hydroxyquinaldine and other halogenated 5-phenyl- and 5-benzyl-8-hydroxyquinolines and quinaldines; also 5-(p-tolyl)-8-hydroxyquinoline and -8-hydroxyquinaldine and other starting materials having alkylated phenyl or benzyl radicals, etc.

As examples of starting materials of the general Formula III the chlorides and bromides of the following carboxylic acids can be mentioned: acetic acid, propionic acid, butyric acid, valeric acid, isovaleric acid, as well as higher fatty acids such as lauric acid, etc., also the chlorides and bromides of halogen fatty acids such as chloroacetic acid, dichloroacetic acid, trichloroacetic acid, α- or β-chloropropionic acid and α- or β-chlorobutyric acid and also chlorides and bromides of benzoic acid, of chlorobenzoic acids and toluic acids, etc.

Examples of compounds of general Formula I according to this invention are: 5-bromo-7-acetyl-8-hydroxyquinaldine, 5-bromo - 7 - benzoyl-8-hydroxyquinoline, 5-benzyl - 7 - acetyl - 8 - hydroxyquinaldine, 5-bromo-7-lauroyl - 8 - hydroxyquinaldine, 5-tert. butyl - 7 - isovaleric-8-hydroxyquinoline, 5-phenyl - 7 - trichloroacetyl - 8 - hydroxyquinaldine, 5-bromo - 7 - dichloroacetyl - 8 - hydroxyquinaldine, 5-chloro - 7 - α - chloropropionly - 8-hydroxyquinoline, 5-bromo - 7 - β - chlorobutyrl-8-hydroxyquinoline, 5-hexyl - 7 - valeroyl-8-hydroxyquinaldine, 5-bromo - 7 - hexoyl-8-hydroxyquinoline, 5-bromo-7-benzoyl-8-hydroxyquinaldine.

Advantageous compounds according to this invention are those corresponding to general Formula I wherein R is hydrogen or methyl, X is chlorine, bromine, lower alkyl (alkyl containing 1–6 carbon atoms), phenyl or benzyl and $R_1$ is an alkyl, particularly effective is an alkyl containing 1–5 carbon atoms, chloro-lower alkyl containing 1–5 carbon atoms (among the chloro-lower alkyl, the mono-, di- and tri-chloromethyls are particularly effective, monochloromethyl being especially effective), phenyl and chlorophenyl.

The following examples further illustrate the production of the new compounds. Parts are given therein as parts by weight and their relationship to parts by volume is as that of grammes to cubic centimetres. The temperatures are in degrees centigrade.

*Example 1*

60 parts of acetyl chloride are added dropwise within half an hour while stirring to a mixture of 90 parts of 5-chloro-8-hydroxyquinoline and 500 parts by volume of anhydrous tetrachloroethane and then 195 parts of aluminium chloride are added in portions over a period of 2 hours, care being taken by cooling that the inner temperature remains between 10 and 20°. The mixture is then heated until, at about 90°, hydrogen chloride begins to develop. The reaction mixture is stirred at 85–90° until, after heating for 10 hours, the development of hydrogen chloride ceases. The reaction can then be regarded as completed. The reaction mass is then poured into a mixture of 1000 parts of ice and 50 parts by volume of concentrated hydrochloric acid, the tetrachloroethane is distilled off with steam and 50 parts of 70% perchloric acid are added to the yellow solution of the hydrochloride of the crude 5-chloro-7-acetyl-8-hydroxyquinoline obtained. After cooling, the perchlorate which precipitates is filtered off under suction and washed with a little water. To remove aluminium salts adhering thereto, the perchlorate is dissolved in a mixture of 3500 parts by volume of hot water and 250 parts by volume of pure, concentrated hydrochloric acid. The solution is treated with animal charcoal, filtered and the perchlorate is allowed to crystallise out. After cooling, the yellow crystals are congregated on a Büchner funnel, washed with a little water and again dissolved in 2000 parts by volume of hot water and 150 parts by volume of pure, concentrated hydrochloric acid. Ammonia is added to the solution at 70° until the reaction is phenolphthalein alkaline and the 5-chloro-7-acetyl-8-hydroxyquinoline is obtained by filtering. After recrystallising once or twice from alcohol, it is obtained in the form of reddish yellow crystals which melt at 152–154°; yield 60–70%.

*Example 2*

5-methyl-7-acetyl-8-hydroxyquinoline is obtained in a manner analogous to that described in Example 1 by reacting 47.5 parts of 5-methyl-8-hydroxyquinoline in 500 parts by volume of o-dichlorobenzene with 40 parts of acetyl chloride in the presence of 120 parts of aluminium chloride at a temperature of 75–85° and working up as described in Example 1. After recrystallising from benzene, this compound forms salmon coloured crystals which melt at 140–142°; yield 60–65%.

*Example 3*

58 parts of o-chlorobenzoyl chloride are added dropwise within half an hour while stirring to a mixture of 58 parts of 5-chloro-8-hydroxyquinaldine and 300 parts by volume of tetrachloroethane and 120 parts of aluminium chloride are added in portions within 2 hours at an inner temperature of 10–20° (external cooling). The reaction mixture is then heated for 12 hours at 100–110° until the development of hydrogen chloride is completed. The reaction mixture is then poured into 500 parts of ice to which 30 parts by volume of concentrated hydrochloric acid have been added and the tetrachloroethane is removed by steam distillation. The crude product which separates cannot be extracted with diluted hydrochloric acid as the hydrochloride of the slightly basic substance is hydrolysed to a great extent. The crude product, in the form of the free base, is therefore dissolved by extraction with benzene. After concentrating the benzene solution and recrystallising the precipitated product from benzene, 5-chloro-7-(o-chlorobenzoyl)-8-hydroxyquinaldine is obtained in the form of yellow needles which melt at 192–193°; yield 50–55%.

*Example 4*

61 parts of o-chlorobenzoyl chloride are added dropwise within half an hour while stirring to a mixture of 47.5 parts of 5-methyl-8-hydroxyquinoline and 300 parts by volume of tetrachloroethane and 120 parts of aluminium chloride are added within 2 hours at an inner temperature of 10–20°. The mixture is heated at 90–95° until hydrogen chloride begins to develop and gradually the inner temperature is raised to 110°. The development of hydrogen chloride is completed after 12 hours. The reaction mass is then poured into a mixture of hydrochloric acid and ice and the solvent is removed by steam distillation. The liquid which remains is separated from a resin which is also formed. On cooling, the crude hydrochloride of the compound desired separates out of the solution. It is purified by dissolving and allowing to crystallise from hot dilute hydrochloric acid. On adding ammonia at 60–70° to the hydrochloric acid solution until the reaction is phenolphthalein alkaline, 5-methyl-7-(o-chlorobenzoyl)-8-hydroxyquinoline precipitates.

A further amount of this product can be obtained from the resin which was removed above. This is done by boiling the resin in dilute hydrochloric acid, dissolving the hydrochloride, which precipitates from the hydrochloric acid solution on cooling, twice in hot hydrochloric acid and allowing to crystallise and then neutralising its hydrochloric acid solution with ammonia as usual. On recrystallising the combined crude products from alcohol and then from benzene, reddish yellow crystals of 5-methyl-7-(o-chlorobenzoyl)-8-hydroxyquinoline are obtained which melt at 187–188°; yield 35–45%.

The following compounds are produced in manners analogous to those given in the above examples:

| | M.P., degrees |
|---|---|
| 5-methyl-7-acetyl-8-hydroxyquinaldine | 73–75 |
| 5-chloro-7-benzoyl-8-hydroxyquinoline | 151–153 |
| 5-chloro-7-acetyl-8-hydroxyquinaldine | 123–125 |
| 5-methyl-7-benzoyl-8-hydroxyquinoline | 136–138 |
| 5-chloro-7-n-butyryl-8-hydroxyquinoline | 109–111 |
| 5-chloro-7-n-butyryl-8-hydroxyquinaldine | 78–80 |
| 5-chloro-7-benzoyl-8-hydroxyquinaldine | 138–139 |
| 5-methyl-7-benzoyl-8-hydroxyquinaldine | 135–137 |
| 5-methyl-7-n-butyryl-8-hydroxyquinoline | 117–119 |
| 5-methyl-7-n-butyryl-8-hydroxyquinaldine | 86–88 |
| 5-chloro-7-isovaleryl-8-hydroxyquinoline | 92–94 |
| 5-chloro-7-(o-chlorobenzoyl)-8-hydroxyquinoline | 164–166 |
| 5-methyl-7-isovaleryl-8-hydroxyquinoline | 79–81 |
| 5-methyl-7-isovaleryl-8-hydroxyquinaldine | 72–74 |
| 5-chloro-7-(p-chlorobenzoyl)-8-hydroxyquinoline | 185–187 |
| 5-methyl-7-(o-chlorobenzoyl)-8-hydroxyquinaldine | 157–158 |
| 5-methyl-7-(p-chlorobenzoyl)-8-hydroxyquinoline | 160–161 |
| 5-methyl-7-(p-chlorobenzoyl)-8-hydroxyquinaldine | 171–172 |
| 5-chloro-7-(p-chlorobenzoyl)-8-hydroxyquinaldine | 185–187 |
| 5-methyl-7-propionyl-8-hydroxyquinoline | 124–126 |
| 5-chloro-7-propionyl-8-hydroxyquinoline | 123–125 |
| 5-methyl-7-propionyl-8-hydroxyquinaldine | 83–85 |
| 5-chloro-7-propionyl-8-hydroxyquinaldine | 86–88 |
| 5-ethyl-7-acetyl-8-hydroxyquinoline | 122–124 |
| 5-chloro-7-chloroacetyl-8-hydroxyquinoline | 167–169 |
| 5-ethyl-7-n-butyryl-8-hydroxyquinoline | 81–82 |
| 5-ethyl-7-propionyl-8-hydroxyquinaldine | 73–75 |
| 5-isoamyl-7-acetyl-8-hydroxyquinoline | 101–102 |
| 5-n-butyl-7-acetyl-8-hydroxyquinoline | 105–107 |
| 5-bromo-7-acetyl-8-hydroxyquinoline | 175–177 |
| 5-benzyl-7-acetyl-8-hydroxyquinoline | 141–143 |
| 5-phenyl-7-acetyl-8-hydroxyquinoline | 157–159 |

The new active substances represented by general Formula I have good fungicidal action in screening tests and they also possess a good fungistatic, bacteriostatic and bacteriocidal action. It has been found e.g. that 5-chloro-7-propionyl-8-hydroxyquinoline and 5-chloro-7-n-butyryl-8-hydroxyquinoline are particularly effective in inhibiting the growth of *Candida albicans*, *Staphylococcus aureus*, *Escherichia coli*, *Klebsiella pneumoniae* and typhus bacilli. The compound 5-phenyl-7-acetyl-8-hydroxyquinoline is a very good tuberculostatic agent.

Compounds such as, for example, 5-chloro-7-acetyl-8-hydroxyquinoline, 5 - methyl - 7 - acetyl-8-hydroxyquinoline are particularly effective in vitro as fungistatics against *Aspergillus fumigatus* and *Microsporum canis*. The compounds 5-chloro-7-n-butyryl-8-hydroxyquinaldine, 5-methyl-7-(p-chlorobenzoyl)-8-hydroxyquinaldine and 5-methyl-7-(o-chlorobenzoyl)-8-hydroxyquinoline are very effective as fungicides against the spores of plant-parasitic fungi such as *Alternaria tenuis*, *Fusarium culmorum*, Clasterosporum etc. Among other purposes, the compounds represented by general Formula I are also suitable for combatting downy and powdery mildew and other fungi in viticulture and fruit culture as well as on other crops and ornamental plants. Some of them have also a systemic action.

The new active ingredients can be used for the protection of organic substrates. They have been found particularly effective for the protection of plants and parts thereof against attack by injurious fungi either as such or combined with suitable carriers and distributing agents as well as with other fungicidally or insecticidally active substances. They can be applied direct to the plant or to the seed bed earth. They are also suitable, however, for the treatment of organic materials such as, for example, wood, textiles, skins and leather.

What I claim is:
1. A compound of the formula

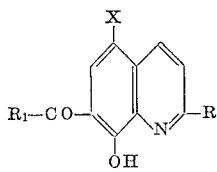

wherein
R is a member selected from the group consisting of hydrogen and methyl,
X is a member selected from the group consisting of chlorine, bromine, lower alkyl, phenyl and benzyl, and
$R_1$ is a member selected from the group consisting of alkyl, chloro-lower alkyl, phenyl and chlorophenyl.
2. 5-ethyl-7-acetyl-8-hydroxyquinoline.
3. 5-ethyl-7-n-butyryl-8-hydroxyquinoline.
4. 5-ethyl-7-propionyl-8-hydroxyquinaldine.
5. 5-bromo-7-acetyl-8-hydroxyquinoline.
6. 5-chloro-7-acetyl-8-hydroxyquinoline.
7. 5-methyl-7-acetyl-8-hydroxyquinoline.
8. 5-chloro-7-acetyl-8-hydroxyquinaldine.
9. 5-chloro-7-n-butyryl-8-hydroxyquinoline.
10. 5-chloro-7-n-butyryl-8-hydroxyquinaldine.
11. 5-methyl-7-n-butyryl-8-hydroxyquinoline.
12. 5-methyl-7-(p-chlorobenzoyl) - 8 - hydroxyquinaldine.
13. 5-chloro-7-propionyl-8-hydroxyquinoline.
14. 5-phenyl-7-acetyl-8-hydroxyquinoline.
15. 5-chloro-7-propionyl-8-hydroxyquinoline.
16. 5-methyl-7-(o-chlorobenzoyl) - 8 - hydroxyquinoline.

References Cited in the file of this patent
UNITED STATES PATENTS

| | | |
|---|---|---|
| 2,411,670 | Senn | Nov. 26, 1946 |
| 2,435,173 | Bavley | Jan. 27, 1948 |
| 2,875,126 | Hodel et al. | Feb. 24, 1959 |

FOREIGN PATENTS

| | | |
|---|---|---|
| 961,668 | Germany | Apr. 11, 1957 |

OTHER REFERENCES

Albert et al.: The British Journal of Experimental Pharmacology, volume 28, pages 69–87 (April 1947).

Rosenmund et al.: Archiv der Pharmazie, volume 279, pages 154–67 (1954).

Thompson et al.: Chemical Abstracts, volume 51, page 15005a (1957).

Matsumara et al.: Jour. Org. Chem., volume 25, pages 853–4 (1960).